United States Patent
Stancil et al.

(10) Patent No.: US 11,520,418 B2
(45) Date of Patent: Dec. 6, 2022

(54) ACTIVE STYLUS POWER MANAGEMENT DESIGN

(71) Applicant: Hewlett-Packard Development Company, L.P., Spring, TX (US)

(72) Inventors: Charles J Stancil, Spring, TX (US); Dale R Knutson, Spring, TX (US); Tai Hsiang Chen, Taipei (TW); Simon H Wong, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/293,012

(22) PCT Filed: Apr. 16, 2019

(86) PCT No.: PCT/US2019/027583
§ 371 (c)(1),
(2) Date: May 11, 2021

(87) PCT Pub. No.: WO2020/214153
PCT Pub. Date: Oct. 22, 2020

(65) Prior Publication Data
US 2022/0027001 A1   Jan. 27, 2022

(51) Int. Cl.
*G06F 3/03* (2006.01)
*G06F 3/0354* (2013.01)
*G06F 3/041* (2006.01)
*G06F 3/038* (2013.01)

(52) U.S. Cl.
CPC .......... *G06F 3/03545* (2013.01); *G06F 3/038* (2013.01); *G06F 3/04162* (2019.05)

(58) Field of Classification Search
CPC .. G06F 3/03545; G06F 3/038; G06F 3/04162; G06F 1/3259; G06F 1/3203
See application file for complete search history.

(56) References Cited

U.S. PATENT DOCUMENTS

| | | | |
|---|---|---|---|
| 7,231,181 B2 | 6/2007 | Kohli et al. | |
| 9,201,523 B1 | 12/2015 | Hwang et al. | |
| 9,678,585 B2 | 6/2017 | Perrin et al. | |
| 10,067,580 B2 | 9/2018 | Shahparnia | |
| 10,101,828 B2 | 10/2018 | Kaplan | |
| 10,162,400 B2 | 12/2018 | Shahparnia et al. | |
| 2013/0106714 A1* | 5/2013 | Shahparnia | G06F 3/03545 345/173 |
| 2014/0059169 A1 | 2/2014 | Ko et al. | |
| 2014/0152576 A1* | 6/2014 | Kim | G06F 3/1423 345/169 |
| 2014/0267184 A1 | 9/2014 | Bathiche et al. | |
| 2016/0209940 A1 | 7/2016 | Geller et al. | |

(Continued)

*Primary Examiner* — Lisa S Landis
(74) *Attorney, Agent, or Firm* — HPI Patent Department

(57) ABSTRACT

In one example, an input pen may include an electronic component, a communication interface to establish a short-range wireless connection with an electronic device, and a controller communicatively coupled to the electronic component and the communication interface. The controller may receive a command from the electronic device via the communication interface. The command may uniquely correspond to an operating mode of the electronic device. Further, the controller may control a power state of the electronic component based on the command.

11 Claims, 7 Drawing Sheets

(56) References Cited

U.S. PATENT DOCUMENTS

| | | |
|---|---|---|
| 2017/0091108 A1 | 3/2017 | Arellano et al. |
| 2018/0232025 A1* | 8/2018 | Bentov ................. G06F 3/0442 |
| 2019/0018544 A1 | 1/2019 | Rosenberg et al. |
| 2019/0026063 A1 | 1/2019 | Mabey et al. |
| 2019/0265819 A1* | 8/2019 | Holland .............. G02F 1/13338 |

* cited by examiner

| BYTE # 402 | 0 | 1 | 2 | 3 | 4 | 5 | 6 | 7 |
|---|---|---|---|---|---|---|---|---|
| CONTENT 404 | OUTPUT REPORT ID | OUTPUT REPORT HID | RSSI REPORT | ACTIVE PEN STATE | FORCE SENSOR STATE | ACCELEROMETER/ GYRO SENSOR STATE | HAPTIC TRANSDUCER | OTHERS |
| VALUE 406 | 0x02 | 0x01 | 0x00 | 0x00 | 0x00 | 0x00 | 0x00 | 0x00 |

1. 0x00: OFF
2. 0x01: ACTIVE MODE (LOW)
3. 0x02: ACTIVE MODE (HIGH)

400

ACTIVE STYLUS POWER MANAGEMENT DESIGN

BACKGROUND

Electronic devices such as tablets, eReaders, mobile phones, smart phones, personal digital assistants (PDAs), and other such devices are commonly used for providing digital content. Example digital content may be in the form of text, audio and videos files, graphics, animations, images, and the like. Such electronic devices sometimes use or include a touch sensitive display, which is useful for displaying a user interface that allows a user to interact with the digital content. The user may interact with the touch sensitive display using a stylus/input pen, for example.

BRIEF DESCRIPTION OF THE DRAWINGS

Examples are described in the following detailed description and in reference to the drawings, in which.

DETAILED DESCRIPTION

Figure 1A:
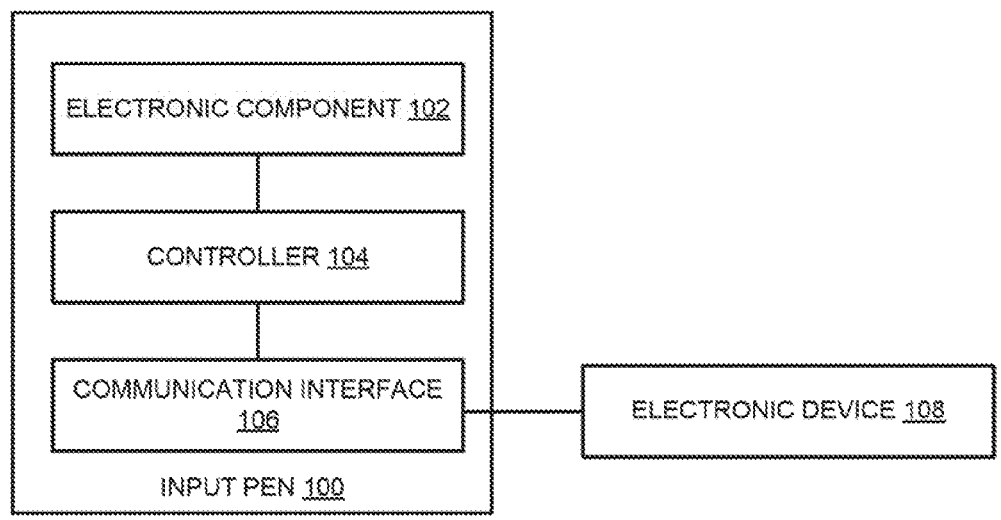
FIG. 1A is a block diagram of an example input pen including a controller to control a power state of an electronic component.

Electronic devices, e.g., tablets, smart phones, laptops, and the like, are increasingly being used in connection with an input pen or stylus (hereinafter these terms are used interchangeably) as an input modality. A stylus may be used to interact with a user interface of an electronic device. Some example interactions by the stylus may include entering text, making selections, or providing input to a touch screen. A stylus can also be used as a digital pen to provide a user with hand writing experience. With increasing applications of the stylus, the stylus may include multiple electronic components such as sensors (e.g., an actuator, a force sensor, an accelerometer sensor, a gyro sensor, and the like) and other components (e.g., an active stylus controller, an audio component, and the like) to support such applications. To enable these and other interactions, the electronic components may require power.

Further, a battery used to power the electronic components of the stylus may have a limited time during which the battery can provide power to the stylus to support various interactions. The battery may limit the design of the stylus due to a size, capacity, or shape of the battery. The limited battery size may limit the battery life of the stylus and hence may impact the stylus usage and function. The electronic components inside the active stylus can draw power from the battery (e.g., Li-ion battery) without control or constraint, which can reduce the battery life and can result in poor user experience while using the active stylus.

Some example methods to manage power for a stylus may use motion detection to toggle power on or off depending on whether the stylus is moving or at rest. However, movement of the stylus that is not intended to 'wake' the stylus from a battery preserving state often occurs when the stylus is being transported. Such movements may cause the stylus to wake up. Further, techniques that rely on a grip/touch sensors or switches are subject to missed detections (e.g., a user wearing a glove), inadvertent switching, and false touch detections. Thus, such methods to manage the power for a stylus may be inefficient, and effect user experience due to excessive battery drain.

In some other examples, the electronic components of the stylus may become active and consume power during an operation of the stylus even though some of the electronic components of the stylus may not be used for that particular operation, thereby resulting in an increased power consumption of the stylus. For example, during an operation of the electronic device in a tablet mode, the stylus may use an active stylus function and may not use accelerometer and gyro functions.

Examples described herein may provide an input pen or stylus for an electronic device. The input pen may include a controller to receive a command from the electronic device via a short-range wireless connection (e.g., Bluetooth interface) and switch a respective power state of different electronic components (e.g., an actuator, a force sensor, an accelerometer sensor, a gyro sensor, an active stylus controller, or an audio component) based on the received command.

In one example, the command may correspond to an operating mode of the electronic device. In another example, the command may correspond to an application being displayed on the electronic device. The controller may control the power state of the electronic component such that the electronic component is to operate in a different power state than a power state of another electronic component of the input pen while the input pen is in the active state. For example, when the electronic device is operating in a tablet mode, the controller may receive the command corresponding to the tablet mode and enable an active stylus function and disable accelerometer and gyro sensors accordingly.

Thus, examples described herein may provide a low cost, high flexibility, and intelligent power management approach to enhance the active stylus battery life and performance, and also improve user experience. The controller can detect the commands and communicate with the electronic device to actively manage power, thereby achieving an efficient power management.

Turning now to the figures, FIG. 1A is a block diagram of an example input pen 100 including a controller 104 to control a power state of an electronic component 102. Input pen 100 may be an electronic pen that can detect an input value and transmit the input value to an electronic device 108. Input pen 100 may include electronic component 102, controller 104, and a communication interface 106.

Controller 104 may be communicatively coupled to electronic component 102 and communication interface 106. Example electronic component 102 may be an actuator, a force sensor, an accelerometer sensor, a gyro sensor, an active input pen controller, or an audio component. Communication interface 106 may establish a short-range wireless connection with electronic device 108. For example, communication interface 106 may include a transmitter, a receiver, or a combination thereof. Communication interface 106 may establish the short-range wireless connection with electronic device 108 via pairing input pen 100 and electronic device 108. Example short-range wireless connection may include a Bluetooth connection, a near filed communication (NFC) connection, a radio frequency identification (RFID) connection, or the like.

During operation, controller 104 may receive a command from electronic device 108 via communication interface 106. In one example, the command may uniquely correspond to a respective operating mode of electronic device 108. Example operating mode may correspond to a clamshell-closed mode (e.g., sleep mode or hibernate mode), a tablet mode, a tent mode, or a laptop mode. In this example, the command can be a first command associated with the clamshell-closed mode, a second command associated with the tablet mode, a third command associated with the laptop mode, or the like. In other words, controller 104 may receive the first command from electronic device 108 when the electronic device is in the clamshell-closed mode, the second command from electronic device 108 when the electronic device is in the tablet mode, or the like.

Further, controller 104 may control a power state of electronic component 102 based on the command. In one example, controller 104 may control the power state of electronic component 102 such that electronic component 102 can operate in a different power state than a power state of another electronic component of input pen 100. For example, when electronic device 108 is operating in the tablet mode, controller 104 may enable electronic component 102 (e.g., an active stylus function) and disable other electronic components (e.g., accelerometer and gyro sensors) of active input pen 100 based on the command that corresponds to the tablet mode.

Figure 1B:
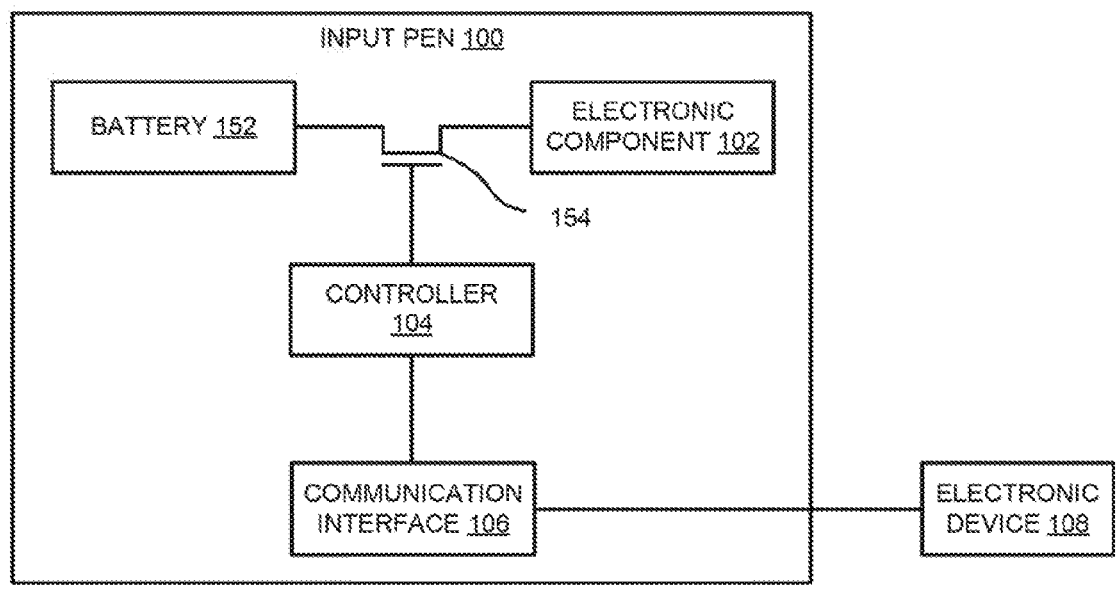
FIG. 1B is a block diagram of the example input pen of FIG. 1A, depicting additional features.

FIG. 1B is a block diagram of example input pen 100 of FIG. 1A, depicting additional features. For example, similarly named elements of FIG. 1B may be similar in structure and/or function to elements described below with respect to FIG. 1A. As shown in FIG. 1B, input pen 100 may include a battery 152 (i.e., a power source) used to power electronic component 102. Input pen 100 may include a power switch 154 coupled between battery 152 and electronic component 102. In this example, controller 104 may control the power state of electronic component 102 via power switch 154. For example, controller 104 may provide a control signal to a base of power switch 154 to operate electronic component 102 in an active low, an active high, or an off state in accordance with the command.

In one example, the components of input pen 100 may be implemented in hardware, machine-readable instructions, or a combination thereof. In one example, controller 104 may be implemented as an engine or module comprising any combination of hardware and programming to implement the functionalities described herein.

Figure 2:
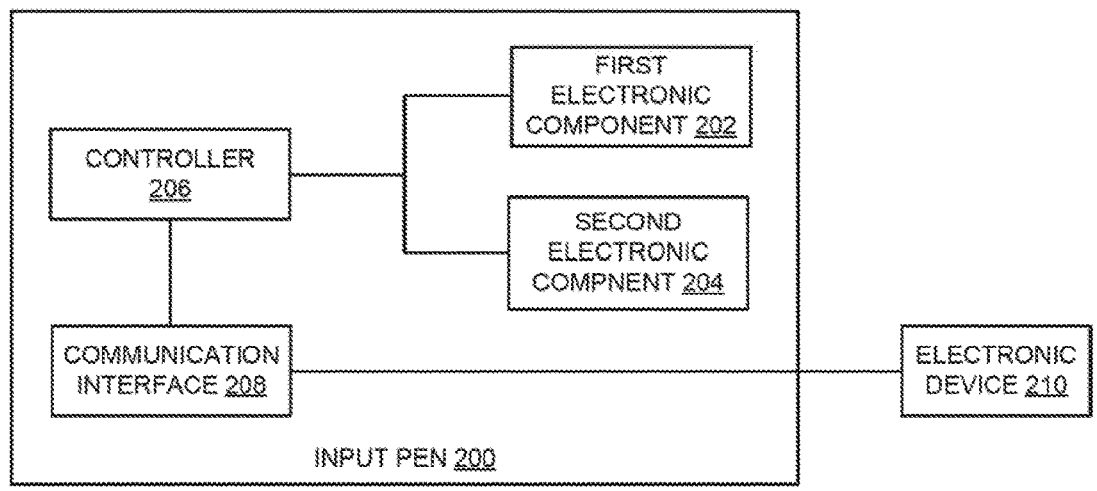
FIG. 2 is a block diagram of an example input pen including a controller to control a respective power state of a first electronic component and a second electronic component.

FIG. 2 is a block diagram of an example input pen 200 including a controller 206 to control a respective power state of a first electronic component 202 and a second electronic component 204. Input pen 200 may include first electronic component 202 and second electronic component 204. Each of first electronic component 202 and second electronic component 204 may be selected from a group consisting of an actuator, a force sensor, an accelerometer sensor, a gyro sensor, an active input pen controller, and an audio component.

Further, input pen 200 may include a communication interface 208 to establish a short-range wireless connection with an electronic device 210. Furthermore, input pen 200 may include controller 206 communicatively coupled to first electronic component 202, second electronic component 204, and communication interface 208.

During operation, controller 206 may receive a command from electronic device 210 via communication interface 208. In one example, the command may uniquely correspond to an operating mode of electronic device 210. In another example, the command may uniquely correspond to an application (e.g., power point presentation) being displayed on electronic device 210.

Further, controller 206 may control a respective power state of first electronic component 202 and second electronic component 204 based on the command such that first electronic component 202 and second electronic component 204 are to operate in different power states. For example, first electronic component 202 may operate in an active high state and second electronic component 204 may operate in an active low or off state based on the command received from electronic device 210. In other words, electronic components that are used for a particular operation on electronic device 210 may be enabled while disabling other electronic components of input pen 200. For example, when the power point presentation is displayed on a display of the electronic device 210, controller 206 may receive a corresponding command to enable accelerometer and gyro sensors and disable other modules accordingly. In this example, the motion and direction of input pen 200 may be detected by accelerometer and gyro sensors.

In one example, input pen 200 may include a first power switch coupled between a power source and first electronic component 202 and a second power switch coupled between the power source and second electronic component 204. In this example, controller 206 may control the respective power state of first electronic component 202 and second electronic component 204 via the first power switch and the second power switch, respectively. This is explained with respect to FIG. 3.

The components of input pen 200 may be implemented in hardware, machine-readable instructions, or a combination thereof. In one example, controller 206 may be implemented as an engine or module comprising any combination of hardware and programming to implement the functionalities described herein.

Figure 3:
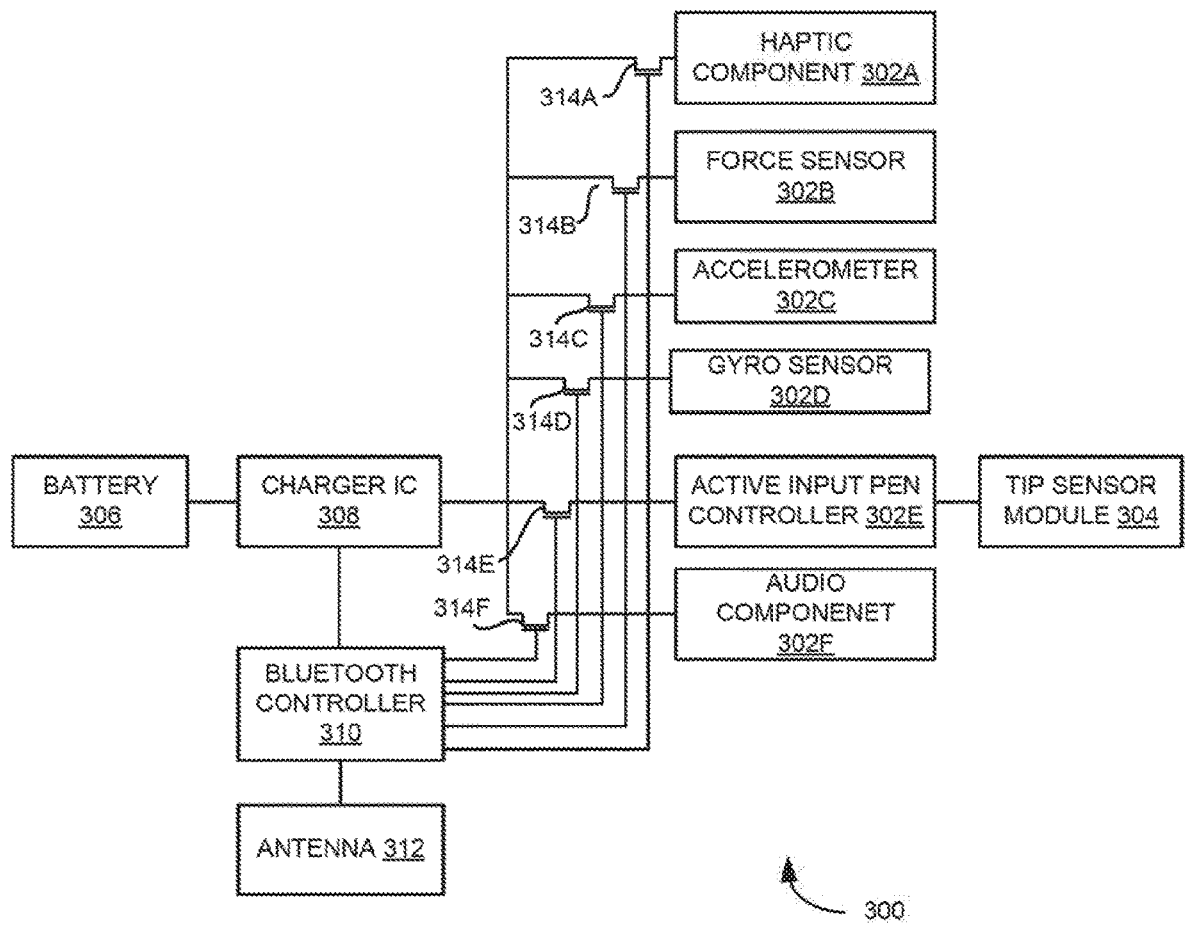
FIG. 3 is a block diagram of an example input pen including a Bluetooth controller to control a respective power state of a plurality of electronic components via corresponding power switches.

FIG. 3 is a block diagram of an example input pen 300 including a Bluetooth controller 310 to control a respective power state of a plurality of electronic components 302A-302F via corresponding power switches 314A-314F. Input pen 300 may include an actuator (e.g., a haptic component 302A), a force sensor 302B, an accelerometer 302C, a gyro sensor 302D, an active input pen controller 302E, and an audio component 302F.

Further, input pen 300 may include an antenna 312 to receive a command from an electronic device. Antenna 312 may be matched with a corresponding transmitting unit in the electronic device. In other examples, antenna 312 may include transmitting ability so that two-way communication can be established with the electronic device. In one example, the antenna 312 may receive the command from the electronic device while input pen 300 is in an active mode or in a sleep mode. Example command may be a Bluetooth command.

Further, input pen 300 may include a battery 306 used to power the electronic components 302A-302F of input pen 300. Input pen 300 may include a charger integrated circuit (IC) 308 to control the charging of battery 306. Charger IC 308 may charge battery 306 and prevent the inflow of overvoltage or overcurrent from an electric charger. In some other examples, charger IC 308 and battery 306 can be implemented as a single battery package.

Furthermore, input pen 300 may include Bluetooth controller 310 communicatively coupled to antenna 312 and charger IC 308. Bluetooth controller 310 may also be coupled to electronic components 302A-302F via respective switches 314A-314F.

Figure 4:
FIG. 4 illustrates a table depicting example Bluetooth commands that can be received by the example input pen of FIG. 3.

During operation, Bluetooth controller 310 may receive the Bluetooth command from the electronic device via antenna 312. FIG. 4 illustrates a table 400 depicting example Bluetooth commands that can be received by input pen 300. In some examples, the Bluetooth commands from the electronic device to input pen 300 can be customized, for instance, by proprietary communicating information. In this example, the customized commands can be conducted from the electronic device to input pen 300 given that the electronic device and input pen 300 are paired and communication format is defined.

In the example table shown in FIG. 4, the Bluetooth commands may include, for example, bytes 402 for controlling the electronic components 302A-302F of input pen 300. Each byte 402 may include a respective unique command (e.g., Byte 0 to Byte 7). Further, content 404 in bytes 402 may represent messages/instructions carried by the Bluetooth commands. Furthermore, value 406 in bytes 402 may represent a power state identifier (ID) of the electronic component. For example, the power state identifiers 0x00, 0x01, and 0x02 can be associated with operations "off", "active low", and "active high", respectively. In the example of FIG. 4, a command "byte 4" with a value "0X00" and an instruction "force sensor state" may enable Bluetooth controller 310 to turn off force sensor 302B.

Referring to FIG. 3, Bluetooth controller 310 may control a power state of one or any combination of electronic components 302A-302F based on the Bluetooth command. For example, different power states of electronic components 302A-302F can be defined as follows:

1. Haptic component 302A: High performance mode, low performance mode, or off state.
2. Force sensor 302B: High scan mode, low scan mode, or off state.
3. Accelerometer 302C and gyro sensor 302D: High frequency mode, low frequency mode, or off state.
4. Active input pen controller 302E: Active mode, sleep mode, or off state.
5. Audio component 302F: Power on, idle, or power off.

In one example, the command may uniquely correspond to an operating mode of the electronic device. The operating mode of the electronic device may correspond to a clamshell-closed mode, a tablet mode, a tent mode, or a laptop mode. For example, when the electronic device is in the sleep or hibernate mode (e.g., clamshell-closed mode), input pen 300 may receive the Bluetooth command (e.g., sleep) from the electronic device and instruct electronic components 302A-302F to enter an off state to save power. When the electronic device is in the tablet mode, input pen 300 may receive the Bluetooth command (e.g., inking or writing), disable the accelerometer 302C and gyro sensor 302D, and enable active input pen controller 302E to control active stylus functions. For example, active input pen controller 302E may use a tip sensor module 304 to detect contact between a tip portion of input pen 300 and a surface of the touch screen or display screen of the electronic device and perform the active stylus functions accordingly (e.g., touch inputs).

In another example, the command may uniquely correspond to an application being displayed on the electronic device. For example, when power point presentation is used on the display screen of the electronic device, input pen 300 may receive Bluetooth command (e.g., presentation), enable accelerometer 302C and gyro sensor 302D, and disable other electronic components (e.g., 302A, 302B, 302E, and 302F) in accordance with the received Bluetooth command. In other examples, when a user wants to disable a certain function on input pen 300, the user can select the function on the electronic device and disable the function via sending a corresponding Bluetooth command from the electronic device.

The components of input pen 300 may be implemented in hardware, machine-readable instructions, or a combination thereof. In one example, Bluetooth controller 310 may be implemented as an engine or module comprising any combination of hardware and programming to implement the functionalities described herein.

Figure 5:
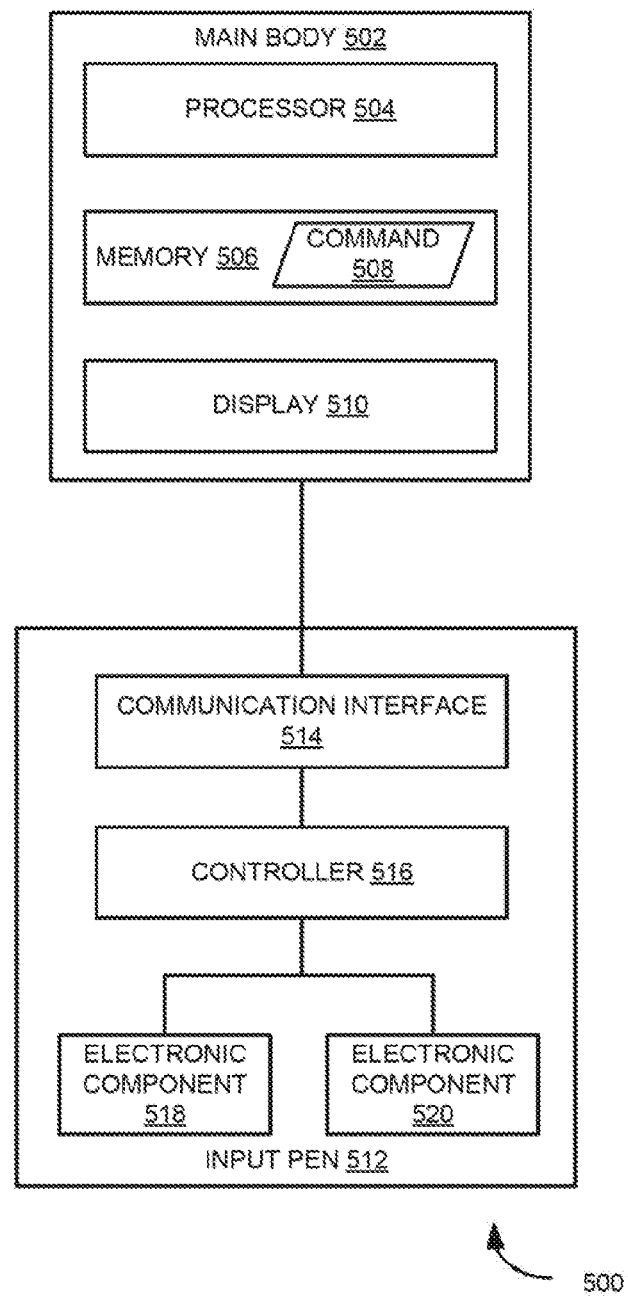
FIG. 5 illustrates a block diagram of an example electronic device including components to control a power state of an electronic component of an input pen.

FIG. 5 illustrates a block diagram of an example electronic device 500 including components to control a power state of an electronic component (e.g., 518) of an input pen 512. Example electronic device 500 may include a mobile phone, a laptop computer, a desktop computer, portable personal computer, all-in-one personal computer, a tablet computer, a notebook computer, a game player, or the like.

Electronic device 500 may include a main body 502. Main body 502 may include a display 510, a memory 506 to store a command 508, and a processor 504. Example display 510 may include a touch sensitive display, which can display a user interface that allows a user to interact with the digital content. Memory 506 may be a storage unit to store a plurality of commands, each command uniquely corresponds to a respective operating mode or a respective application that is displayed on display 510. In the example shown in FIG. 5, memory 506 is shown as a part of electronic device 500, however, memory 506 can also reside in an external storage device, such as a hard disk, a storage card, or a data storage medium and can be accessible by electronic device 500.

Further, electronic device 500 may include an input pen 512 detachably connected with main body 502 and interactive with display 510. Input pen 512 may include electronic components 518 and 520. Further, input pen 512 may include a communication interface 514 to establish a short-range wireless connection with main body 502. In one example, input pen 512 and main body 502 may be paired together via the short-range wireless connection. Example short-range wireless connection may include a Bluetooth connection, NFC connection, RFID connection, or the like. For example, input pen 512 may be an electronic pen or stylus that can provide input to main body 502 when input pen 512 contacts display 510 in a pen input mode. In other examples, input pen 512 may transmit data to main body 502 of electronic device 500 wirelessly through communication interface 514.

Furthermore, input pen 512 may include a controller 516 communicatively coupled to electronic component 518 and communication interface 514. During operation, controller 516 may receive command 508 from main body 502 via communication interface 514.

In one example, processor 504 may determine an operating mode of main body 502. Example operating mode may correspond to a clamshell-closed mode, a tablet mode, a tent mode, or a laptop mode. Further, processor 504 may retrieve command 508 corresponding to the determined operating mode of main body 502. In one example, processor 504 may retrieve command 508 from the plurality of commands based on the operating mode of main body 502. For example, processor 504 may retrieve a sleep command when electronic device 500 is in a hibernate mode. Furthermore, processor 504 may transmit command 508 to input pen 512 via the short-range wireless connection. In the above example, input pen 512 may receive the sleep command and enter an off state to save power. In some examples, main body 502 may include an antenna (e.g., transmitter and receiver) to transmit command and receive input signals from input pen 512.

In another example, processor 504 may determine an application that is displayed on display 510. Example application may include a power point presentation, a gaming application, a video application, or the like. Further, processor 504 may retrieve command 508 corresponding to the application being displayed on display 510. In one example, processor 504 may retrieve command 508 from the plurality of commands based on the application being displayed on display 510. For example, processor 504 may retrieve a gaming command when a gaming application being displayed on display 510. Furthermore, processor 504 may transmit command 508 to input pen 512 via the short-range wireless connection. In the above example, input pen 512 may receive the gaming command and enable electronic component 518 (e.g., which can be used by the gaming application) and disable other electronic component 520 (e.g., which may not be needed for the gaming application) while input pen 512 is in the active state.

Thus, controller 516 may control a power state of electronic component 518 such that electronic component 518 may operate in a different power state than a power state of another electronic component 520 based on command 508. For example, controller 516 may switch the power state of electronic component 518 to an active low, an active high, or an off state based on command 508.

In one example, the components of electronic device 500 may be implemented in hardware, machine-readable instructions or a combination thereof. In one example, processor 504 may execute stored instructions in memory 506. Processor 504 can be a single core processor, a multi-core processor, a computing cluster, or any number of other configurations. Processor 504 may be implemented as Complex Instruction Set Computer (CISC) or Reduced Instruction Set Computer (RISC) processors, x86 Instruction set compatible processors, multi-core, or any other microprocessor or central processing unit (CPU). In some examples, processor 504 may include dual-core processor(s), dual-core mobile processor(s), or the like.

Memory 506 may be a non-transitory machine-readable medium such as random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. Memory 506 can be used to store computer-readable instructions that, when executed by processor 504, direct processor 504 to perform various operations in accordance with embodiments described herein. For example, the instructions that are executed by processor 504 may be used to implement a method that determines an operating mode of electronic device 500 or an application being displayed on electronic device 500, retrieves command 508 corresponding to the operating mode of electronic device 500 or the application being displayed on electronic device 500, and transmits the command to input pen 512.

Controller 516 may be implemented as an engine or module comprising any combination of hardware and programming to implement the functionalities described herein. For example, the instructions that are executed by controller 516 be used to implement a method that receives the command and controls the power state of the electronic components 518 and 520.

Figure 6:
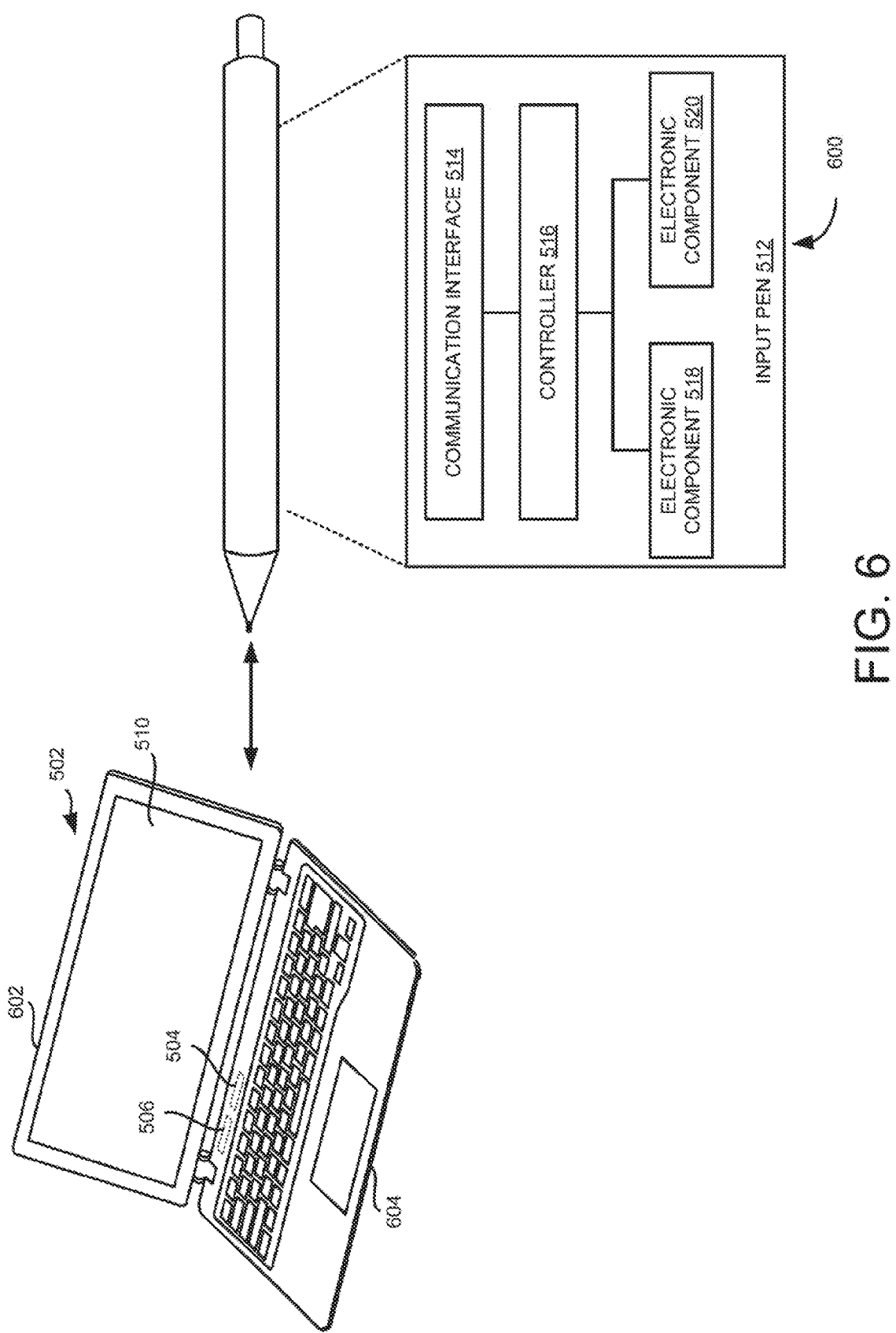
FIG. 6 is a schematic diagram of the example electronic device of FIG. 5.

FIG. 6 is a schematic diagram of example electronic device 500 of FIG. 5. For example, similarly named elements of FIG. 6 may be similar in structure and/or function to elements described below with respect to FIG. 5. As shown in FIG. 6, main body 502 may include a display housing 602 and a base housing 604 pivotally, detachably, or twistably connected to display housing 602. For example, display housing 602 may include display 510 and base housing 604 may include a keyboard. As described above, example operating mode may correspond to a clamshell-closed mode, a tablet mode, a tent mode, or a laptop mode.

The term "clamshell-closed mode" may refer to a configuration in which display 510 is facing the keyboard and the two are parallel. The term "tent mode" may refer to a configuration in which display 510 is facing the user in landscape or inverted landscape orientation and is more than 180° open from the clamshell-closed state but may not be fully in the tablet (360°) mode. The term "tablet mode" may refer to a configuration in which display 510 is facing the user in landscape, portrait, inverted landscape, or inverted portrait orientation. In the tablet mode, the keyboard is facing in the opposite direction from display 510 and the two are parallel. In the laptop mode, display housing 602 may be oriented at an angle, for example an obtuse angle, relative to base housing 604 to allow the user to view display 510 and to allow access to a keyboard of base housing 604. In these examples, input pen 512 may receive a command that uniquely corresponds to the operating mode of the electronic device and controls the power state of the electronic components and sensors accordingly.

Figure 7A:
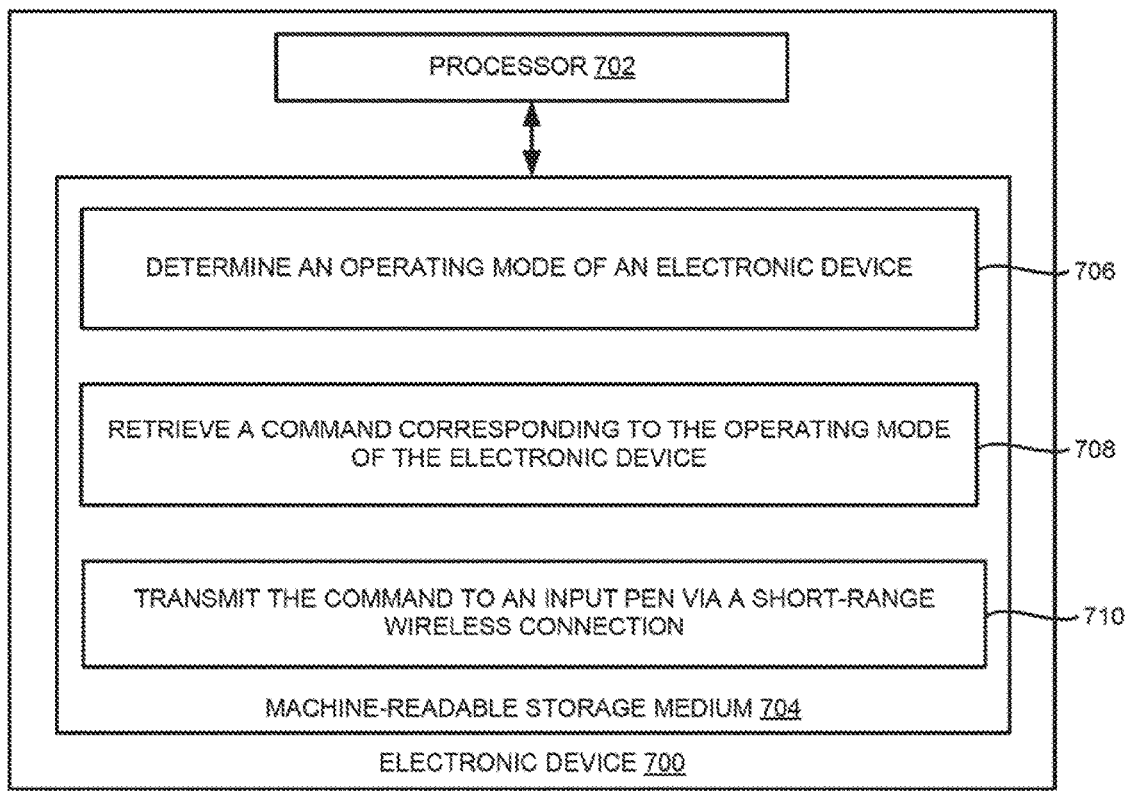
FIGS. 7A and 7B illustrate block diagrams of an example electronic device including a non-transitory machine-readable storage medium, storing instructions to transmit a command to control a power state of an electronic component of an input pen.
Figure 7B:
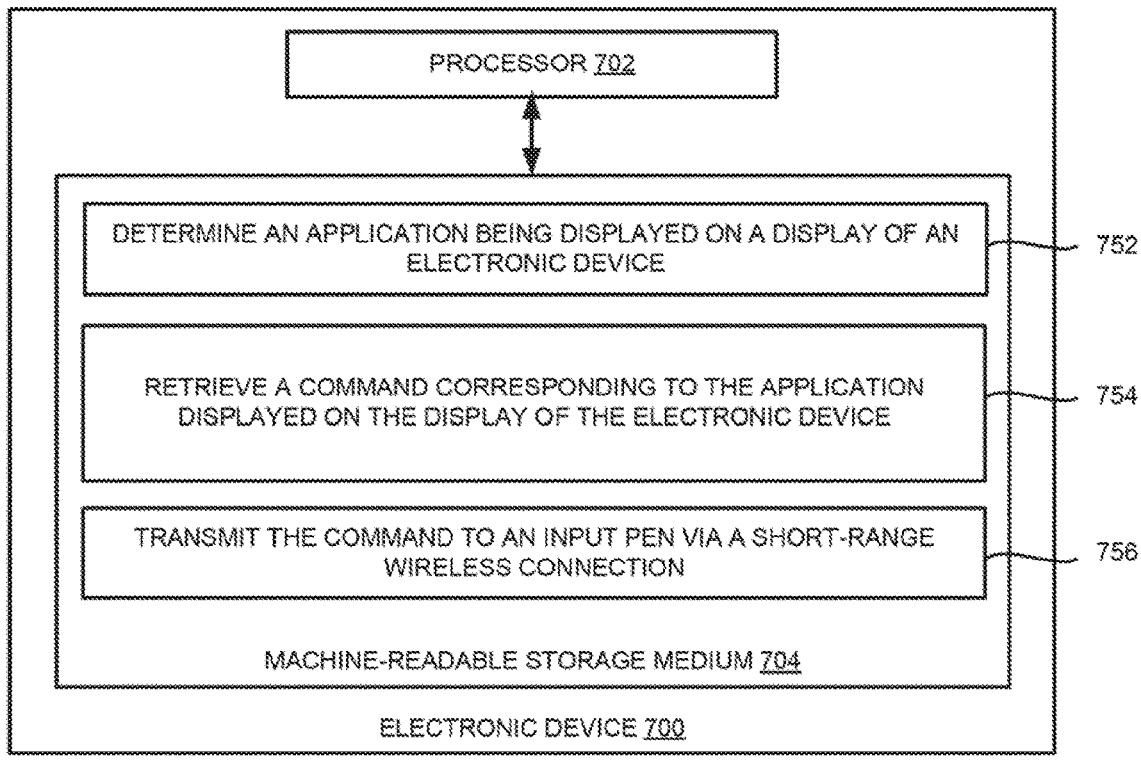

FIGS. 7A and 7B illustrate block diagrams of an example electronic device 700 including a non-transitory machine-readable storage medium 704, storing instructions to transmit a command to control a power state of an electronic component of an input pen. Electronic device 700 may include a processor 702 and machine-readable storage medium 704 communicatively coupled through a system bus. Processor 702 may be any type of central processing unit (CPU), microprocessor, or processing logic that interprets and executes machine-readable instructions stored in machine-readable storage medium 704. Machine-readable storage medium 704 may be a random-access memory (RAM) or another type of dynamic storage device that may store information and machine-readable instructions that may be executed by processor 702. For example, machine-readable storage medium 704 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 704 may be a non-transitory machine-readable medium. In an example, machine-readable storage medium 704 may be remote but accessible to electronic device 700.

In one example shown in FIG. 7A, machine-readable storage medium 704 may store instructions 706-710. In an example, instructions 706-710 may be executed by processor 702 to retrieve and transmit the command to the input pen based on an operating mode of electronic device 700. Instructions 706 may be executed by processor 702 to determine an operating mode of electronic device 700. Instructions 708 may be executed by processor 702 to retrieve a command corresponding to the operating mode of electronic device 700. The command may correspond to a predefined protocol of electronic device 700 and known to the input pen. Instructions 710 may be executed by processor 702 to transmit the command to the input pen via a short-range wireless connection.

In another example shown in FIG. 7B, machine-readable storage medium 704 may store instructions 752-756. In an example, instructions 752-756 may be executed by processor 702 to retrieve and transmit the command to the input pen based on an application being displayed on electronic device 700. Instructions 752 may be executed by processor 702 to determine an application being displayed on a display of electronic device 700. Instructions 754 may be executed by processor 702 to retrieve a command corresponding to the application displayed on the display of electronic device 700. The command may correspond to a predefined protocol of electronic device 700 and known to the input pen. Instructions 756 may be executed by processor 702 to transmit the command to the input pen via a short-range wireless connection.

Figure 8:
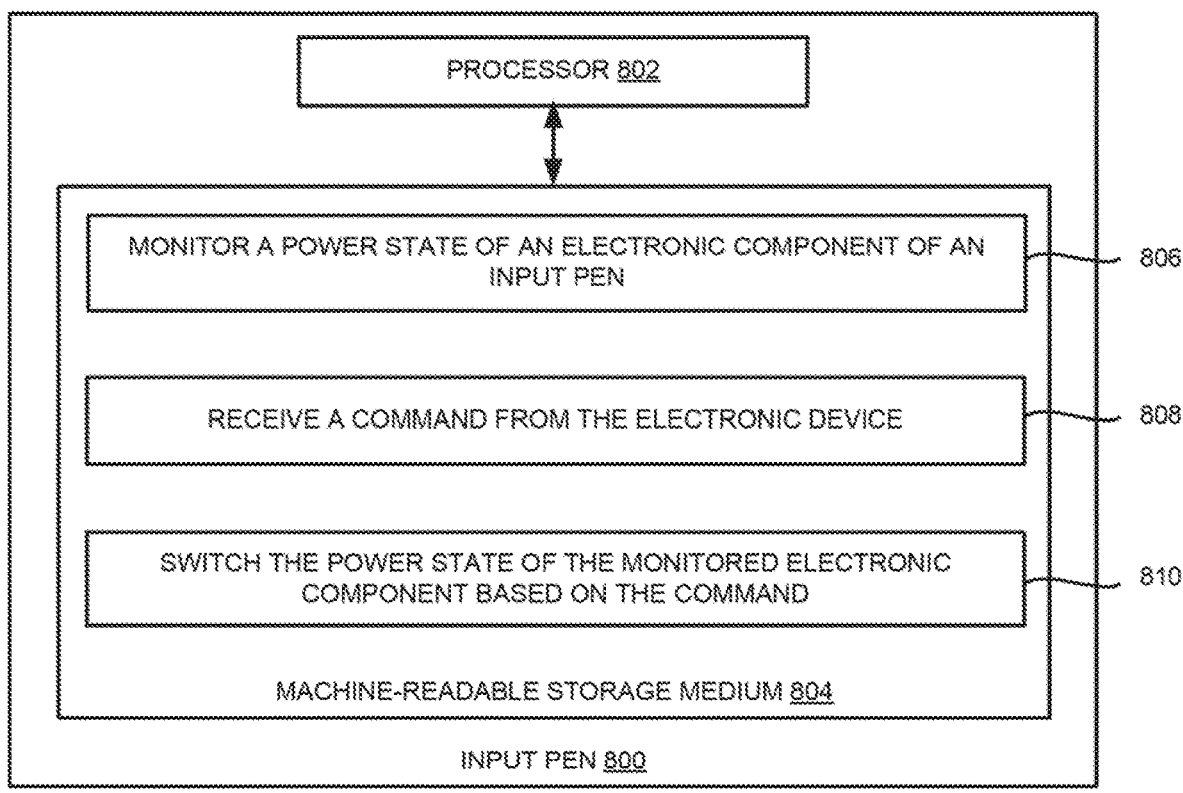
FIG. 8 illustrates a block diagram of an input pen including a non-transitory machine-readable storage medium, storing instructions to receive a command and control a power state of an electronic component of the input pen.

FIG. 8 illustrates a block diagram of an input pen 800 including a non-transitory machine-readable storage medium 804, storing instructions to receive the command and control the power state of the electronic component of input pen 800. Input pen 800 may include a processor 802 and machine-readable storage medium 804 communicatively coupled through a system bus. Processor 802 may be any type of central processing unit (CPU), microprocessor, or processing logic that interprets and executes machine-readable instructions stored in machine-readable storage medium 804. Machine-readable storage medium 804 may be a random-access memory (RAM) or another type of dynamic storage device that may store information and machine-readable instructions that may be executed by processor 802. For example, machine-readable storage medium 804 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, machine-readable storage medium 804 may be a non-transitory machine-readable medium.

Machine-readable storage medium 804 may store instructions 806-810. In an example, instructions 806-810 may be executed by processor 802 to control the power state of the electronic component of input pen 800. Instructions 806 may be executed by processor 802 to monitor a power state of the electronic component of input pen 800. Instructions 808 may be executed by processor 802 to receive the command from electronic device (e.g., electronic device 700 as shown in FIG. 7A or FIG. 7B). Instructions 810 may be executed by processor 802 to switch the power state of the monitored electronic component based on the command. Upon switching the power state of the monitored electronic component, processor 802 may return to a default state and continue to monitor the electronic component.

It may be noted that the above-described examples of the present solution are for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

What is claimed is:

1. An input pen comprising:
   an electronic component;
   a communication interface to establish a short-range wireless connection with an electronic device; and
   a controller communicatively coupled to the electronic component and the communication interface to:
   receive a command from the electronic device via the communication interface, wherein the command uniquely corresponds to an operating mode of the electronic device, and wherein the operating mode of the electronic device is determined based on an orientation of a display housing relative to a base housing; and
   control a power state of the electronic component based on the command.

2. The input pen of claim 1, wherein the controller is to control the power state of the electronic component based on the command such that the electronic component is to operate in a different power state than a power state of another electronic component of the input pen.

3. The input pen of claim 1, further comprising:
   a power switch coupled between a power source and the electronic component, wherein the controller is to control the power state of the electronic component via the power switch.

4. The input pen of claim 1, wherein the communication interface is to establish the short-range wireless connection with the electronic device via pairing the input pen and the electronic device, wherein the short-range wireless connection is a Bluetooth connection, a near field communication connection, or a radio frequency identification connection.

5. The input pen of claim 1, wherein the operating mode corresponds to a clamshell-closed mode, a tablet mode, a tent mode, or a laptop mode.

6. An input pen comprising:
   first and second electronic components;
   a communication interface to establish a short-range wireless connection with an electronic device; and a controller communicatively coupled to the first and second electronic components and the communication interface to:
  receive a command from the electronic device via the communication interface, wherein the command uniquely corresponds to an application being displayed on the electronic device; and
  control a respective power state of the first and second electronic components based on the command such that the first electronic component and the second electronic component are to operate in different power states.

7. The input pen of claim 6, wherein the first electronic component and the second electronic component are selected from a group consisting of an actuator, a force sensor, an accelerometer sensor, a gyro sensor, an active input pen controller, and an audio component.

8. The input pen of claim 6, further comprising:
a first power switch coupled between a power source and the first electronic component; and
a second power switch coupled between the power source and the second electronic component, wherein the controller is to control the respective power state of the first electronic component and the second electronic component via the first power switch and the second power switch, respectively.

9. An electronic device comprising:
a main body comprising:
  a display housing including a display;
  a base housing pivotally connected to the display housing, wherein the base housing comprises:
    a memory to store a command; and
    a processor to:
      determine an operating mode of the main body, wherein the operating mode of the main body is determined based on an orientation of the display housing relative to the base housing;
      retrieve a command corresponding to the operating mode of the main body; and
      transmit the command; and
an input pen detachably connected with the main body and interactive with the display, wherein the input pen comprises:
  an electronic component;
  a communication interface to establish a short-range wireless connection with the main body; and
  a controller communicatively coupled to the electronic component and the communication interface to:
    receive the command from the main body via the communication interface; and
    control a power state of the electronic component such that the electronic component is to operate in a different power state than a power state of another electronic component of the input pen based on the command.

10. The electronic device of claim 9, wherein the controller is to switch the power state of the electronic component to an active low, an active high, or an off state based on the command.

11. The electronic device of claim 9, wherein the input pen and the main body are paired together via the short-range wireless connection, wherein the short-range wireless connection comprises a Bluetooth connection, a near field communication connection, or a radio frequency identification connection.

* * * * *